June 30, 1959 R. DEIBEL 2,892,206
WINDSHIELD WIPER DRIVE MECHANISM
Filed Nov. 12, 1953

INVENTOR.
Raymond Deibel
BY
Beau, Brooks, Buckley & Beau
ATTORNEYS.

United States Patent Office 2,892,206
Patented June 30, 1959

2,892,206

WINDSHIELD WIPER DRIVE MECHANISM

Raymond Deibel, Cheektowaga, N.Y., assignor to
Trico Products Corporation, Buffalo, N.Y.

Application November 12, 1953, Serial No. 391,460

10 Claims. (Cl. 15—253)

This invention relates to an automotive windshield cleaner, and more particularly to the power transmitting means therefor.

It has been proposed to utilize a flexible transmission between the windshield wiper and its drive means. However, due to the stresses to which such transmission is subjected in normal use, the cables thereof tend to stretch and lose their tautness. Accordingly, it has been found necessary to provide auxiliary means to take up the slack in the cables. However, the means heretofore employed for this purpose have been difficult to install and equally difficult to adjust once installed, resulting in excessive use of time, effort and money.

Accordingly, it is an object of the present invention to provide cable tensioning means which may be installed and adjusted with facility.

It is a further object of the invention to provide means which will automatically stress the cables by an amount sufficient to create the desired tension therein.

Figure 1:
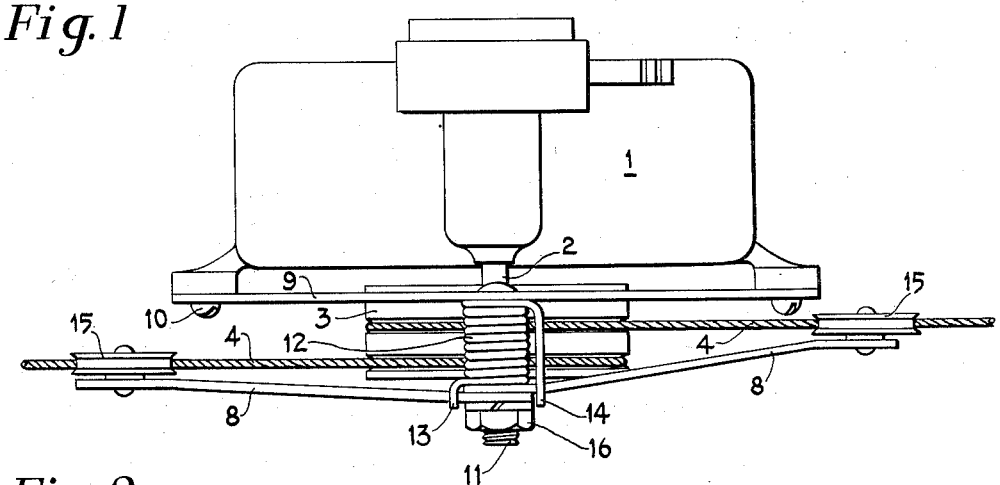
Figure 2:
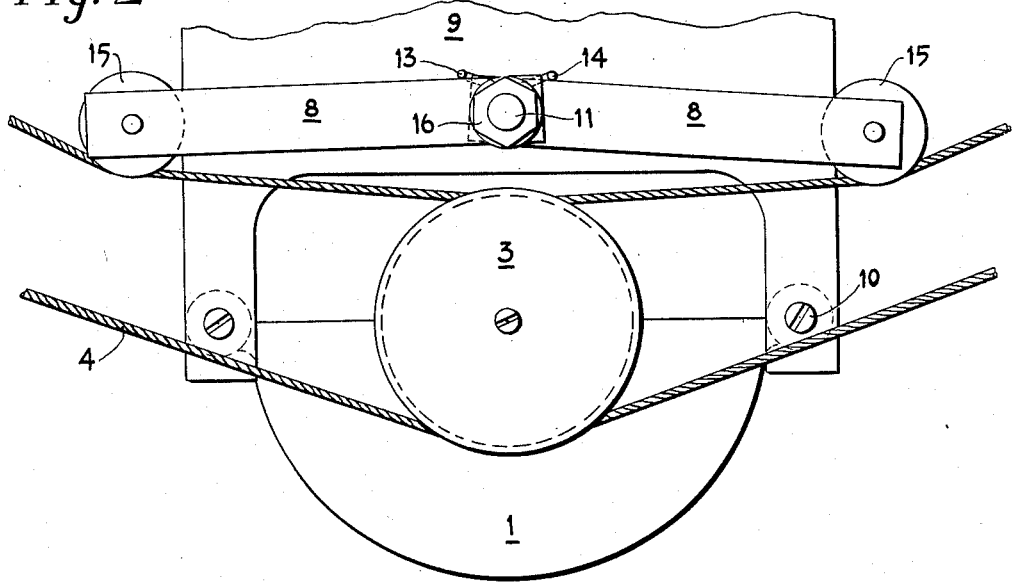
Figure 3:
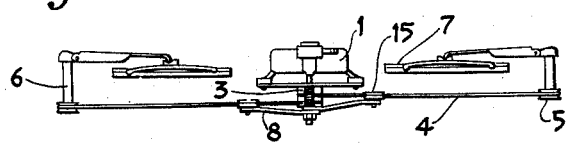

For a better understanding of these and other objects of the invention, reference is made to the following specifications and accompanying drawings wherein:

Figs. 1 and 2 are top plan and rear elevational views, respectively, of the windshield wiper driving means with an automatic tensioner constructed in accordance with the instant invention attached thereto; and Fig. 3 is a diagrammatic view illustrating the general arrangement of the windshield cleaner.

Referring now more particularly to the drawings, the numeral 1 designates the windshield cleaner driving means which may be of any conventional type such as the vacuum motor now commonly employed. 2 is the drive shaft, and 3 is the drum pulley mounted thereon. As is best seen in Figs. 1 and 3, the cables 4 are wound about the drum 3 and pulleys 5 mounted on wiper actuating shafts 6. When the motor 1 is in operation, the shaft 2 is oscillated thereby and this motion is transmitted to the wiper shafts and the wipers 7 mounted thereon by drum pulley 3, cables 4 and pulleys 5.

In order for the cleaner to operate most efficiently, the proper tension must be maintained in the cables. To this end, tensioning arms 8 are provided. Bracket 9 connected to the motor at 10 is utilized to mount the motor on the firewall or dashboard of the vehicle. Tensioning arms 8 are pivotally mounted on stub shaft 11 which is centrally located on the bracket. Torsion spring 12, concentric with the shaft, is interposed between the bracket and tensioning arms. The spring is prestressed, with the ends 13 and 14 thereof bent forward so that they overlie the arms and tend to rotate them downward, each arm providing the support for the spring as it applies thrust to the opposite arm. Pulleys 15 are pivotally mounted at the extremities of arms 8 and ride on cables 4. The cables resist the thrust applied to the arms by the torsion spring and are thereby tensioned to the desired amount as best illustrated in Fig. 2. Jam nut 16 is then turned down so as to lock the arms in the adjusted position and thus maintain the stress in the cables. In the event that the cables are stretched during use, it is merely necessary to loosen the jam nut so as to permit a further rotation of the tensioning arms in order to take up the slack. Retightening the nut will lock the arms in their new position and thus maintain the proper degree of tension in the cables.

It may therefore be seen that since the tensioning means are attached to the motor mounting bracket, installation of such means presents no problem. Further, merely by loosening and then tightening the jam nut, tension of the desired magnitude is created in and maintained in the cables.

The foregoing description has been given for clearness of understanding and not by way of limitation since the inventive principles involved are capable of assuming other physical embodiments without departing from the spirit of the invention.

Having thus disclosed an exemplary embodiment thereof, what I claim as my invention is:

1. A windshield cleaner for automotive vehicles comprising drive means having a drive shaft, a plurality of wipers having actuating shafts, a flexible transmission operatively connecting said drive shaft to each of said wiper actuating shafts, pivotally mounted tensioning means carried by said drive means and engaging said flexible transmission means between said drive shaft and each of said wiper actuating shafts, and torsion spring means applying thrust to said tensioning means with the flexible transmission between said drive shaft and each of said wiper actuating shafts resisting such thrust and thereby supporting said spring means as it applies thrust to said tensioning means against the flexible transmission between said drive shaft and another of said wiper actuating shafts.

2. A windshield cleaner for automotive vehicles comprising, drive means having a shaft, a plurality of wipers having actuating shafts, a flexible transmission operatively connecting said drive shaft to each of said wiper actuating shafts, a plurality of independently pivotal tensioning arms each carrying a pulley at one end, said pulleys riding one on each of said flexible transmissions, and a single torsion spring applying thrust to both of said tensioning arms with each arm providing support for said spring as it applies thrust to another arm.

3. A windshield cleaner for automotive vehicles comprising, drive means having a drive shaft, a bracket fixedly mounted on said drive means, a plurality of wipers having actuating shafts, a flexible transmission operatively connecting said drive shaft and wiper actuating shafts, a stub shaft mounted on said bracket, a plurality of tensioning arms each pivotally mounted on said stub shaft at one end and carrying a pulley at its opposite end, different ones of said pulleys riding on different ones of said flexible transmissions, and a torsion spring applying thrust to said tensioning arms with each arm providing support to said spring as it applies thrust to another arm.

4. A windshield cleaner for automotive vehicles comprising, drive means having a drive shaft, a plurality of wipers having actuating shafts, a flexible transmission operatively connecting said wiper actuating shafts to said drive shaft on opposite sides thereof, pivotally mounted tensioning means carried by the drive means and engaging said flexible transmission on opposite sides of the drive shaft, common torsion spring means applying thrust to said tensioning means, and common lock means to releasably hold said tensioning means against rotation.

5. A windshield cleaner for automotive vehicles comprising, drive means having a drive shaft, a plurality of wipers having actuating shafts, a flexible transmission operatively connecting said drive shaft to each of said wiper actuating shafts, a plurality of independently pivotal tensioning arms each carrying a pulley at one end, said pulleys riding on said flexible transmission between said drive shaft and each of said actuating shafts, common torsion spring means applying thrust to both of said tensioning arms, and common means to lock said tensioning arms against rotation.

6. A windshield cleaner for automotive vehicles comprising, drive means having a drive shaft, a bracket fixedly mounted on said drive means, a plurality of wipers having actuating shafts, a flexible transmission operatively connecting said drive shafts to said wiper actuating shafts, a stub shaft mounted on said bracket, a plurality of tensioning arms each pivotally mounted on said stub shaft at one end and carrying a pulley at its opposite end, said pulleys riding on said flexible transmission between said drive shaft and each of said actuating shafts, a torsion spring carried by the stub shaft for applying thrust to said tensioning arms, each of said arms providing support for said spring as it applies thrust to another of said arms, and means to lock said tensioning arms against rotation.

7. A windshield cleaner for automotive vehicles comprising, drive means having a drive shaft, a plurality of wipers having actuating shafts, a flexible transmission operatively connecting said drive shaft and said wiper actuating shafts, a plurality of pivotal tensioning arms engaging flexible transmission between said drive shaft and all of said wiper actuating shafts, and a prestressed torsion spring applying thrust to said tensioning arms, each end of said spring overlying one of said arms so that each arm provides support for said spring as it applies thrust to the opposite arm.

8. A windshield cleaner for automotive vehicles comprising, drive means having a drive shaft, a bracket fixedly mounted on said drive means, a plurality of wipers having actuating shafts, a flexible transmission operatively connecting said drive shaft and wiper actuating shafts, a stub shaft mounted on said bracket, a plurality of tensioning arms each pivotally mounted on the stub shaft at one end and carrying a pulley at its opposite end, said pulleys riding on said flexible transmission between said drive shaft and each of said wiper actuating shafts, and a prestressed torsion spring applying thrust to said tensioning arms, each end of said spring overlying one of said arms so that each arm provides support for said spring as it applies thrust to the opposite arm.

9. A windshield cleaner for automotive vehicles comprising, drive means having a drive shaft, a plurality of wipers having actuating shafts, a flexible transmission operatively connecting said drive shaft to each of said wiper actuating shafts, a plurality of pivotal tensioning arms each carrying a pulley at one end, said pulleys riding on the flexible transmissions, a prestressed torsion spring for applying thrust to said tensioning arms so that each arm provides support for said spring as it applies thrust to the opposite arms, and common lock means to releasably hold said tensioning arms against rotation.

10. A windshield cleaner for automotive vehicles comprising, drive means having a drive shaft, a bracket fixedly mounted on said drive means, a plurality of wipers having actuating shafts on opposite sides of said drive shaft, a flexible transmission operatively interconnecting said drive shaft and said wiper actuating shafts, a stub shaft mounted on said bracket, a plurality of tensioning arms each pivotally mounted on said stub shaft at one end and carrying a pulley at its opposite end, said pulleys riding on said flexible transmisson on opposite sides of the drive shaft, a prestressed torsion spring carried by the stub shaft for applying thrust to said tensioning arms, each end of said spring overlying one of said arms so that each arm provides support for said spring as it applies thrust to the opposite arm, and common means to lock said tensioning arms against rotation.

References Cited in the file of this patent

UNITED STATES PATENTS

| | | |
|---|---|---|
| 980,435 | Prentice | Jan. 3, 1911 |
| 1,848,423 | Jackson | Mar. 8, 1932 |
| 2,110,439 | Gordon | Mar. 8, 1938 |
| 2,547,285 | Rappl | Apr. 3, 1951 |
| 2,611,148 | Rappl | Sept. 23, 1952 |

FOREIGN PATENTS

| | | |
|---|---|---|
| 271,117 | Great Britain | of 1928 |